(12) United States Patent
Matsumoto

(10) Patent No.: US 8,423,801 B2
(45) Date of Patent: Apr. 16, 2013

(54) ELECTRONIC DEVICE, AND METHOD OF CONTROLLING THE ELECTRONIC DEVICE

(75) Inventor: Hideto Matsumoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 572 days.

(21) Appl. No.: 12/690,091

(22) Filed: Jan. 19, 2010

(65) Prior Publication Data

US 2010/0250990 A1    Sep. 30, 2010

(30) Foreign Application Priority Data

Mar. 30, 2009   (JP) ................................ 2009-082206

(51) Int. Cl.
G06F 1/26        (2006.01)

(52) U.S. Cl.
USPC ............... 713/300; 713/310; 726/34; 726/35; 726/36

(58) Field of Classification Search ................. 713/300, 713/310, 340; 726/34, 35, 36
See application file for complete search history.

(56) References Cited

U.S. PATENT DOCUMENTS

| | | | | |
|---|---|---|---|---|
| 5,911,777 A * | 6/1999 | Heredia | .......................... | 726/35 |
| 2005/0081060 A1 * | 4/2005 | Gancarcik et al. | ............ | 713/201 |
| 2005/0289359 A1 | 12/2005 | Mori et al. | | |
| 2007/0254697 A1 * | 11/2007 | Sugio et al. | ................. | 455/556.2 |

FOREIGN PATENT DOCUMENTS

| | | |
|---|---|---|
| JP | H09-006493 A | 1/1997 |
| JP | 2005-346172 A | 12/2005 |
| JP | 2007-176104 A | 7/2007 |
| JP | 2008-159166 A | 7/2008 |

* cited by examiner

*Primary Examiner* — Paul Yanchus, III
(74) *Attorney, Agent, or Firm* — Baker Botts L.L.P.

(57) ABSTRACT

An electronic device including an external-memory-medium installing portion in which an external memory medium storing contents data, a display portion for displaying the contents data, a sound generating portion for generating a sound, a power-shut-down-requirement receiving portion for receiving a requirement for shutting-down a power supply to the electronic device, a monitoring portion for determining whether the external memory medium is installed in the external-memory-medium installing portion, a sound-generation commanding portion for commanding command the sound generating portion to generate an alarming sound when the monitoring portion has determined that the external memory medium is not installed in the external-memory-medium installing portion while the contents data are displayed, and a power supply control portion for inhibiting an operation to shut down the power supply to the electronic device when the power-shut-down-requirement receiving portion has received the requirement for shutting down the power supply while the contents data are displayed.

18 Claims, 2 Drawing Sheets

ELECTRONIC DEVICE, AND METHOD OF CONTROLLING THE ELECTRONIC DEVICE

CROSS REFERENCE TO RELATED APPLICATION

The present application claims the priority from Japanese Patent Application No. 2009-082206 filed on Mar. 30, 2009, the disclosure of which is herein incorporated by reference in its entirety.

BACKGROUND OF THE INVENTION

1. Field of the Invention

The present invention relates generally to an electronic device configured to display contents data stored in a removably installed external memory medium, and more particularly to a technique that permits restraint of removal of the external memory medium from the electronic device.

2. Description of Related Art

There is known an electronic device such as a printing device and a facsimile device, which is operated in retail shops to display on its display portion demonstration data for sales promotion of the electronic device. An example of a known printing device is configured to display demonstration data according to a demonstration display command file stored in an external memory medium in the form of a memory card, such that a power switch of the printing device can be operated while the demonstration data are displayed.

An example of a known optical disk device is configured to generate an alarming sound when a memory medium storing data is removed from the optical disk device.

SUMMARY OF THE INVENTION

There has been a theft by a criminal third party of an external memory medium from the electronic device displayed in the retail shops. Described in detail, the power switch of the electronic device is turned off to remove power from the electronic device during its operation to display the demonstration data, to prevent generation of the alarming sound, prior to removal of the external memory medium from the electronic device for the purpose of stealing the external memory medium.

It is a first object of the present invention to provide an electronic device that permits restraint of removal of an external memory medium therefrom, without using mechanical means for preventing removal of the external memory device. It is a second object of the invention to provide a method of controlling the electronic device so as to restrain the user from removing the external memory device.

The first object indicated above can be achieved according to a first aspect of this invention, which provides an electronic device comprising: an external-memory-medium installing portion in which an external memory medium that can store contents data, a display portion configured to be operable to display the contents data stored in the external memory medium, a sound generating portion configured to generate a sound, a power-shut-down-requirement receiving portion configured to receive a requirement for shutting-down a power supply to the electronic device, a contents-data-display commanding portion configured to command the display portion to display the contents data stored in the external memory medium, a monitoring portion configured to determine whether the external memory medium is installed in the external-memory-medium installing portion, while the contents data are displayed by the display portion, a first sound-generation commanding portion configured to command the sound generating portion to generate an alarming sound when the monitoring portion has determined that the external memory medium is not installed in the external-memory-medium installing portion while the contents data are displayed by the display portion, and a power supply control portion configured to inhibit an operation to shut down the power supply to the electronic device when the power-shut-down-requirement receiving portion has received the requirement for shutting down the power supply while the contents data are displayed by the display portion.

The second object described above can be achieved according to a second aspect of this invention, which provides a method of controlling an electronic device including an external-memory-medium installing portion in which an external memory medium that can store contents data, a display portion configured to be operable to display the contents data stored in the external memory medium, and a sound generating portion configured to generate a sound, the method comprising: receiving a requirement for shutting-down a power supply to the electronic device; commanding the display portion to display the contents data stored in the external memory medium; monitoring to determine whether the external memory medium is installed in the external-memory-medium installing portion while the contents data are displayed by the display portion; commanding the sound generating portion to generate an alarming sound when it is determined that the external memory medium is not installed in the external-memory-medium installing portion while the contents data are displayed by the display portion; and inhibiting an operation to shut down the power supply to the electronic device when the requirement for shutting down the power supply has been received while the contents data are displayed by the display portion.

BRIEF DESCRIPTION OF THE DRAWINGS

The above and other objects, features, advantages and technical and industrial significance of the present invention will be better understood by reading the following detailed description of a preferred embodiment of the present invention, when considered in connection with the accompanying drawings, in which.

DETAILED DESCRIPTION OF THE PREFERRED EMBODIMENTS

Figure 1:
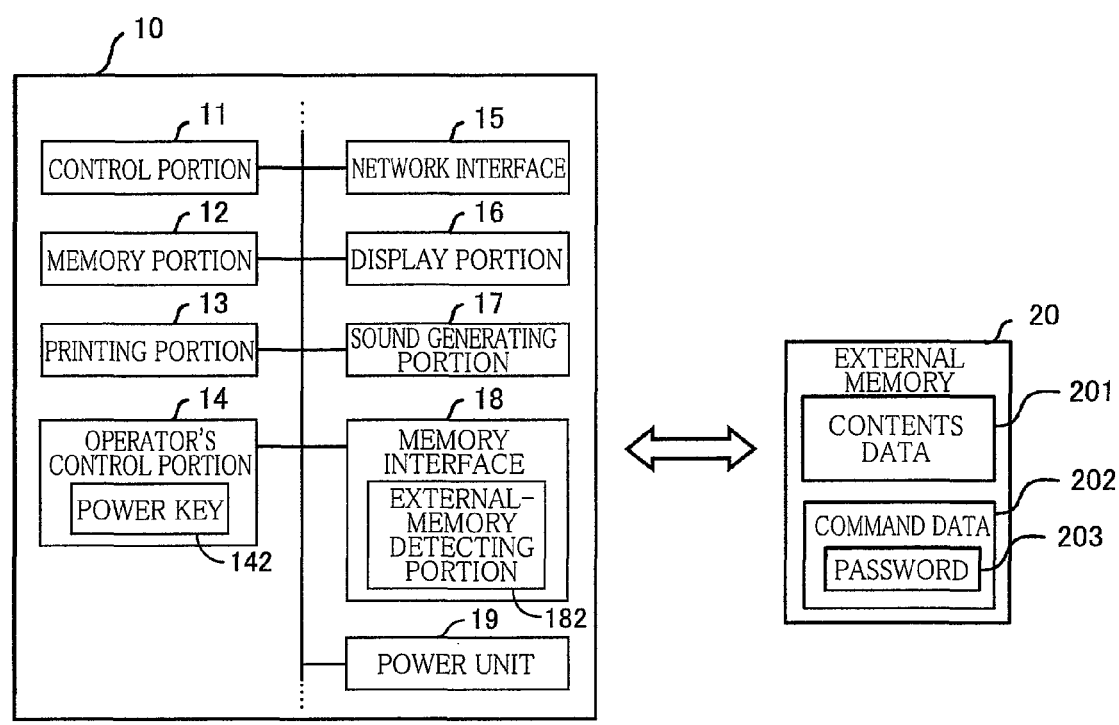
FIG. 1 is a block diagram showing a multi-function device, and an external memory removably installable in the multi-function device.

The preferred embodiment of this invention will be described in detail, by reference to the accompanying drawings, wherein the block diagram of FIG. 1 shows an electronic device in the form of a multi-function device 10 constructed according to the preferred embodiment.

The multi-function device 10 includes a control portion 11, a memory portion 12 storing various kinds of data, a printing portion 13 configured to perform a printing operation, an operator's control portion 14 provided to permit the user of the multi-function device 10 to control the multi-function device 10, a network interface 15 connected to a network line (not shown) for communication with other devices, a display portion 16 configured to display various kinds of information, a sound generating portion 17 constituted by a speaker, for example, an external-memory-medium installing portion in the form of a memory interface 18 in which an external memory 20 is removably installed, and a power unit 19 connected to a power line (not shown) for power supply to the multi-function device 10. The control portion 11 incorporates a CPU, a ROM and a RAM and is configured to control various functions of the multi-function device 10 according to control programs stored in the ROM. The external memory 20 is an external memory medium such as a USB memory. The control portion 11 and the various portions 12-19 are connected to each other through a bus line, so that the various portions 12-19 are controlled by the control portion 11.

The memory interface 18 includes an external-memory detecting portion 182 configured to detect the external memory 20 installed in the memory interface 18. The control portion 11 refers to the external-memory detecting portion 182 to determine whether the external memory 20 is presently installed in the memory interface 18.

When the external memory 20 is installed in the memory interface 18, the control portion 11 reads out contents data 201 stored in the external memory 20, and commands the display portion 16 to display the read-out contents data 201. The control portion 11 further commends the printing portion 13 to perform the printing operation, and commands the sound generating portion 17 to generate a sound. In the present embodiment, the contents data 201 are used for demonstration in retail shops for sales promotion of the present multi-function device 10.

The operator's control portion 14 has a power key 142 which is pressed to apply and remove power to and from the multi-function device 10. Namely, the multi-function device 10 is switchable by the operation of the power key 142 between a power-on state for power supply from the power unit 19 to the multi-function device 10, and a power-off state for shutting down the power supply from the power unit 19 to the multi-function device 10 is inhibited.

The sound generating portion 17 is configured to generate a sound the volume of which can be increased or reduced under the control of the control portion 11.

The external memory 20 is the memory medium which stores the contents data 201 and command data 202. The command data 202 include a password 203 as certification information in the form of a plurality of characters. For example, the contents data 201 represent image data and/or movie data.

When the external memory 20 is installed in the memory interface 18, the control portion 11 initially reads out the command data 202 from the external memory 20, so that the contents data 201 stored together with the command data 202 in the external memory 20 is displayed according to the read-out command data 202.

As indicated above, the command data 202 are related to the contents data 201 and the password 203. In other words, the contents data 201 and the password 203 are related to each other via the command data 202.

Figure 2:
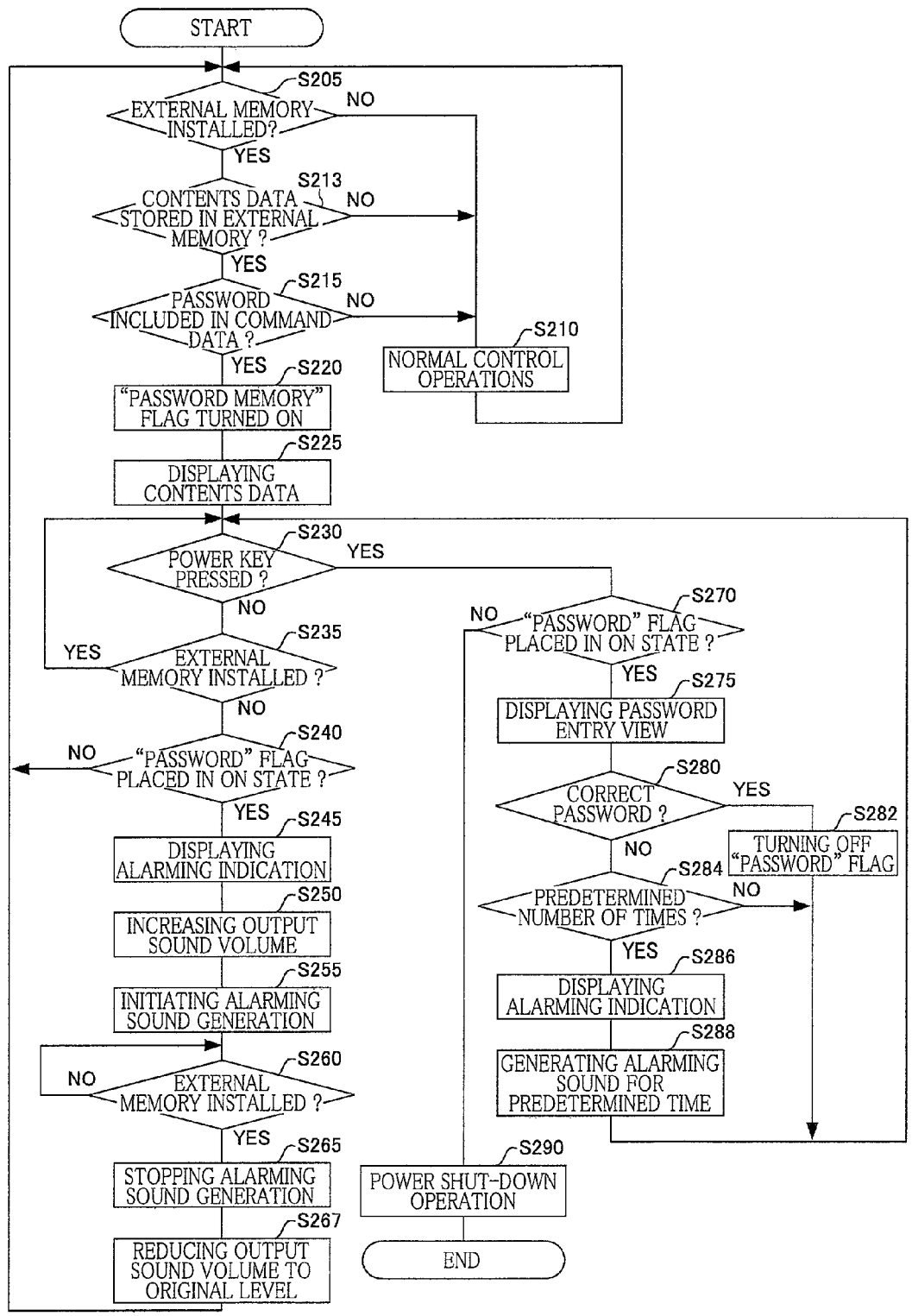
FIG. 2 is a flow chart illustrating a main control routine executed by the multi-function device.

Referring next to the flow chart of FIG. 2, there will be described a main control routine executed by the control portion 11 of the multi-function device 10 according to a control program stored in the ROM. This main control routine is initiated when the power key 142 is pressed to apply power to the multi-function device 10.

When the power is applied to the multi-function device 10, the main control routine is initiated with step S205 in which the control portion 11 determines whether the external memory 20 is installed in the memory interface 18. If a negative determination (NO) is obtained in S205, the control flow goes to step S210 in which normal control operations of the multi-function device 10 are performed. The normal control operations include an operation to control a printing operation of the printing portion 13, for example.

If an affirmative determination (YES) is obtained in step S205, the control flow goes to step S213 to reads out the command data 202 from the external memory 20, and to determine whether the contents data 201 specified by the command data 202 as the data to be displayed are stored in the external memory 20.

If a negative determination (NO) is obtained in step S213, the control flow goes to step S210 in which the control portion 11 performs the normal control operations. In this case, the normal control operations include an operation to retrieve from the external memory 20 some data other than the contents data 201, or an operation to store some data in the external memory 20.

If an affirmative determination (YES) is obtained in step S213, the control flow goes to step S215 in which the control portion 11 determines whether the password 203 is included in the command data 202. It will be understood that a portion of the control portion 11 assigned to implement the step S215 serves as a determining portion configured to determine whether the certification information in the form of the password 203 is present in the external memory 20.

If a negative determination (NO) is obtained in step S215, the control flow goes to step S210 in which the control portion 11 performs the normal control operations. In this case, the normal control operations include, for example, an operation to command the display portion 16 to display the contents data 201 according to the command data 202 which are stored in the external memory 20 and which do not include the password 203, and an operation to permit an operation to shut down the power supply from the power unit 19 in response to a pressing operation of the power key 142 while the contents data 201 are displayed according to the command data 202 not including the password 203. It will be understood that a portion of the control portion 11 assigned to implement the step S210 serves as a first power control portion configured to permit an operation to shut down the power supply to the multi-function device 10 when the power key 142 is operated to shut down the power supply, while the password 203 related to the contents data 201 is not present in the external memory 20.

If an affirmative determination (YES) is obtained in step S215, the control flow goes to step S220 to turn on a PASSWORD flag in the RAM. The PASSWORD flag placed in the on state indicates that the external memory 20 storing the command data 202 including the password 203 is installed in the memory interface 18.

Then, the control flow goes to step S225 in which the control portion 11 reads out the contents data 201 from the external memory 20, and commands the display portion 16 to display the read-out contents data 201.

The control flow then goes to step S230 in which the control portion 11 determines whether the power key 142 has been pressed by the user to shut-down the power supply from the power unit 19 to the multifunction device 10 while the contents data 201 are displayed on the display portion 16. If a negative determination (NO) is obtained in step S230, the control flow goes to step S235 in which the control portion 11 determines whether the external memory 20 is installed in the memory interface 18. It will be understood that a portion of the control portion assigned to implement the step S235 serves as a monitoring portion configured to determine whether the external memory medium in the form of the external memory 20 is installed in the external-memory-medium installing portion in the form of the memory interface 18 while the contents data 201 are displaced by the display portion 16. When the power key 142 is pressed, a signal indicative of the pressing operation of the power key 142 is applied to the control portion 11, so that the control portion 11 recognizes the pressing operation of the power key 142.

As long as the external memory 20 remains installed in the memory interface 18, that is, if an affirmative determination (YES) is obtained in step S235, the control flow goes back to step S230 to determine again whether the power key 142 has been pressed. If a negative determination (NO) is obtained in step S235, that is, if the external memory 20 has been removed from the memory interface 18, the control flow then goes to step S240 in which the control portion 11 determines whether the PASSWORD flag in the RAM is placed in the on state. If a negative determination (NO) is obtained in step S240, the control flow goes back to step S205.

If an affirmative determination (YES) is obtained in step S240, the control flow goes to step S245 in which the control portion 11 commands the display portion 16 to display an alarming indication prompting the user to install the removed external memory 20 in the memory interface 18, and then goes to step S250 to increase the output sound volume of the sound generating portion 17. For instance, the alarming indication to be displayed on the display portion 16 reads "INSTALL AGAIN THE REMOVED EXTERNAL MEMORY".

The output volume of the sound generating portion 17 is increased to generate an alarming sound with the increased output volume in the next step S255. This output volume of the alarming sound is larger than a normal output volume of the sound generating portion 17 when sounds other than the alarming sound are generated by the sound generating portion 17. In the present embodiment, the output volume of the alarming sound is the highest output level of the sound generating portion 17. It will be understood that a portion of the control portion 11 assigned to implement the step S250 serves as a sound-level control portion configured to control an output sound level of the sound generating portion 17 such that a volume of the alarming sound generated by the sound generating portion 17 is larger than a volume of sounds other than the alarming sound.

Then, the control flow goes to step S255 in which the control portion 11 commands the sound generating portion 17 to initiate the generation of the alarming sound according to alarming sound data stored in the memory portion 12 of the multi-function device 10. It will be understood that a portion of the control portion 11 assigned to implement the step S255 serves as a first sound-generation commanding portion configured to command the sound generating portion to generate an alarming sound when the monitoring portion (11, S235) has determined that the external memory 20 is not installed in the memory interface 18 while the contents data 201 are displayed by the display portion 16.

The control flow then goes to step S260 in which the control portion 11 determines whether the external memory 20 once removed has been installed again in the memory interface 18. If an affirmative determination (YES) is obtained in step S260, the control flow goes to step S265 to stop the generation of the alarming sound by the sound generating portion 17.

The control flow then goes to step S267 in which the control portion 11 reduces the output sound volume of the sound generating portion 17 from the highest level to the normal level. The step S267 is followed by the step S205 described above.

If it is determined in step S230 that the power key 142 has been pressed while the contents data 201 stored in the external memory 20 are displayed, that is, if an affirmative determination (YES) is obtained in step S230, the control flow goes to step S270 in which the control portion 11 determines whether the PASSWORD flag in the RAM is placed in the on state. It will be understood that a portion of the control portion 11 assigned to implement the step S230 cooperates with the power key 142 to serve as a power-shut-down-requirement receiving portion configured to receive a requirement for shutting-down a power supply to the multi-function device 10.

If an affirmative determination is obtained in step S270, the control flow goes to step S275 in which the control portion 11 commands the display portion 16 to provide a password entry view prompting the user to enter the password, and permits the entry of the password by the user through the operator's control portion 14. For example, the password entry view provides a message "PLEASE ENTER A PASSWORD FOR SHUTTING DOWN POWER SUPPLY TO THE DEVICE". It will be understood that the password entry view serves as a certification-entry view prompting an entry of the certification information in the form of the password 203, when the power key 142 is pressed to shut-down the power supply to the multi-function device 10 while the contents data 201 are displayed by the display portion 16. It will also be understood that a portion of the control portion 11 assigned to implement the step S275 serves as an entry-view displaying portion configured to command the display portion 16 to provide the certification-entry view.

The step S275 is followed by step S280 in which the control portion 11 determines whether the password entered by the user is correct, that is, whether the entered password is coincident with the password 203 included in the command data 202 stored in the external memory 20.

If an affirmative determination (YES) is obtained in step S280, the control flow goes to step S282 in which the control portion 11 turns off the PASSWORD flag in the RAM, and then goes back to step S230. If a negative determination (NO) is obtained in step S280, the control flow goes to step S284 to determine whether an entry of incorrect passwords in step S275 has been repeated a predetermined number of times.

If a negative determination (NO) is obtained in step S284, the control flow goes back to the step S230. If an affirmative determination (YES) is obtained in step S284, the control flow goes to step S286 in which the control portion 11 commands the display portion 16 to display an alarming indication prompting the user to enter the correct password. For instance, the alarming indication to be displayed in this step S286 reads "INQUIRE THE ADMINISTRATOR OF THE MULTI-FUNCTION DEVICE OF THE CORRECT PASSWORD".

The control flow then goes to step S288 in which the control portion 11 commands the sound generating portion 17 to generate an alarming sound, and then goes back to the step S230. It will be understood that a portion of the control portion 11 assigned to implement the step S288 serves as a second sound-generation commanding portion configured to command the sound generating portion 17 to generate the alarming sound when the power key 142 is pressed while the contents data 201 are displayed by the display portion 16, provided that the password 203 related to the contents data 201 is present in the external memory 20, and provided that the information entered through password entry view is not coincident with the password 203.

If the PASSWORD flag in the RAM is not placed in the on state, that is, if a negative determination (NO) is obtained in the above-described step S270, the control flow goes to step S290 in which the control portion 11 implements a power shut-down operation for terminating the operation of the display portion 16 to display the contents data 201 and for shutting down the power supply from the power unit 19. The power shut-down operation in the present multi-function device 10 is similar to those of the prior art multi-function devices, and no further description of the power shut-down operation is deemed necessary. The present main control routine of FIG. 2 is terminated with the step S290. Thus, the control portion 11 permits the power shut-down operation if the correct password has been entered in the step S275 before the power key 142 is pressed to shut-down the power supply to the multi-function device 10. In this respect, it is noted that the negative determination (NO) obtained in step S270 indicates that the PASSWORD flag was turned off in step S282, that is, the correct password was entered in step S280. Accordingly, the control portion 11 permits the power shut-down operation when the power key 142 is operated in step S230, provided that the correct password has been entered in step S280. It will be understood that a portion of the control portion 11 assigned to implement the step S290 serves as a second power control portion configured to permit the operation to shut down the power supply to the multi-function device 10 when the power key 142 is pressed while the contents data 201 are displayed by the display portion 17, provided that the password 203 is present in the external memory 20, and provided that the information entered through the password entry view is coincident with the password 203.

There will be described advantages of the multi-function device 10 constructed according to the illustrated embodiment of the invention described above.

The illustrated multi-function device 10 is arranged to inhibit the power shut-down operation even when the power key 142 is pressed to implement the power shut-down operation while the contents data 201 are displayed, if the correct password identical with the password 203 included in the command data 202 has not been entered before the power key 142 is pressed. Since the power shut-down operation is inhibited when the correct password has not been entered before the power key 142 is pressed, the display portion 16 is enabled to provide the password entry view prompting the user to enter the correct password. Thus, the present multi-function device 10 is configured to restrain the user to remove the external memory 20 after the power supply to the multi-function device 10 is shut-down to prevent generation of the alarming sound. It will be understood that the control portion 11 serves as a power supply control portion configured to inhibit the power shut-down operation even when the power key 142 is pressed to shut-down the power supply to the multi-function device 10 while the contents data 201 are displayed by the display portion 16.

The present multi-function device 10 is further arranged to permit the operation to shut down the power supply when the power key 142 is pressed, if the password 203 is not included in the command data 202. Thus, the power shut-down operation of the multi-function device 10 is permitted or inhibited depending upon whether the password 203 is included in the command data 202, in relation to the contents data 201.

When the password entered through the password entry view is coincident with the password 203 included in the command data 202, the power supply to the multi-function device 10 can be shut down even while the contents data 201 are displayed. However, the multi-function device 10 is configured to inhibit the power shut-down operation by the third party who does not know the password 203, making it possible to restrain the third party from removing the external memory 20 after the power shut-down operation to prevent the generation of the alarming sound.

If the entry of incorrect passwords has been repeated the predetermined number of times, the alarming sound is generated to prevent the third party from trying to enter many different passwords for seeking the correct password that permits the removal of the external memory 20 without generation of the alarming sound.

If the external memory 20 is removed without an entry of the correct password, the generated alarming sound informs the administrator of the multi-function device 10 of the removal of the external memory 20. If the correct password is entered by the administrator, the removal of the external memory 20 does not cause the generation of the alarming sound. Thus, the present multi-function device 10 is arranged to restrain the third party not knowing the password 203, from removing the external memory 20.

The present multi-function device 10 is further arranged such that the alarming sound is generated with the highest output level that can be generated by the sound generating portion, so that the administrator of the multi-function device 10 can easily perceive the generated alarming sound, while the person who removed the external memory 20 from the memory interface 18 is surprised at the considerably high volume of by the generated alarming sound, and tends to return the removed external memory 20 back to the memory interface 18. Thus, it is possible to restrain the third party from removing the external memory 20 for the purpose of stealing the external memory 20.

Although the preferred embodiment of this invention has been described in detail, for illustrative purpose only, it is to be understood that the present invention is not limited to the details of the illustrated embodiment, but may be embodied with various changes and modifications, which may occur to those skilled in the art, without departing from the spirit and scope of the invention defined in the appended claims.

In the illustrated embodiment, the power supply from the power unit 19 is completely shut down in the steps S210 and S290. Where the printing portion 13 is an ink-jet printing mechanism, for example, however, the steps S210 and S290 may be modified so as to apply power to the ink-jet printing mechanism to an extent that permits an operation of the ink-jet printing mechanism for avoiding plugging of its ink-jet printing head with an ink.

In the illustrated embodiment, the password 203 is included in the command data 202 provided to command the display portion 16 to display the contents data 201. However, the password 203 need not be included in the command data 202, provided that the password 203 is stored in the external memory 20 such that the password 203 is related to the contents data 201, so that the determination is made in the step S280 as to whether a password entered while the contents data 201 are displayed is coincident with the password 203 stored in the external memory 20.

Although illustrated embodiment uses the password 203 in the form of a series of characters as the certification information, the certification information may include information entered by predetermined operation or operations such as a pressing operation of a specific key, pressing operations of specific keys, a pressing operation of a key for more than a predetermined length of time, or pressing operations of a plurality of keys in a predetermined order, or an operation of entering specific information such as finger-print information or an ID card information of an administrator of the electronic device. In these cases, the external memory 20 stores the contents data 201 in relation to the information indicative of the predetermined operation or operations. Further, the step S215 is modified to determine whether the information entered by the predetermined operation or operations is stored in the external memory 20, and the step S275 is modified so that the display portion 16 provides a view prompting to perform the specific key operation or operations or enter the finger-print or ID card information, while the step S280 is modified to determine whether the specific key operation or operations has/have been performed or whether the finger-print or ID card information has been entered.

In the illustrated embodiment, the determination is made in the step S230 as to whether the power key 142 has been operated while the contents data 201 are displayed. Where a plurality of sets of contents data 201 stored in the external memory 20 are displayed one after another with a certain length of time interval, the determination is also made during this length of time interval during which the contents data 201 are not displayed.

In the illustrated embodiment, the determination is made in the step S260 as to whether the external memory 20 once removed from the memory interface 18 has been returned back to the memory interface 18. In this connection, it is desirable to obtain ID information identifying the external memory 20 installed in the memory interface 18 in the step S205, and to determine in the step S270 whether the external memory 20 identified by the obtained ID information has been returned back to the memory interface 18. In this case, it is possible to prevent stopping the generation of the alarming sound in the step S265 where an external memory different from the external memory 20 removed from the memory interface 18 is returned to the memory interface 18.

In the illustrated embodiment, the password entry view is displayed on the display portion 16 when the power key 142 is pressed. Where a predetermined processing operation (an operation other than the pressing operation of the power key 142, e.g., entry of a password) is required to shut down the power supply to the multi-function device 10, the password entry view may be displayed when the operator's control portion 14 is operated to implement the predetermined processing operation.

The illustrated embodiment is arranged such that the password entry view is displayed on the display portion 16 when the power key 142 is pressed while the contents data 201 are displayed. However, this arrangement is not essential. That is, even when the power key 142 is pressed while the contents data 201 are displayed, the password entry view need not be displayed, but the display portion 16 may provide a message "POWER SUPPLY CANNOT BE SHUT DOWN DURING DEMONSTRATION", or may continue to display the contents data 201 without any change of the display contents. This arrangement also makes it possible to prevent the third party from shutting down the power supply to the electronic device 10, and to restrain the third party from removing the external memory 20 after the power shut-down operation to prevent the generation of the alarming sound.

The illustrated embodiment is further arranged to determine whether the password 203 is included in the command data 202, and to inhibit the operation to shut down the power supply to the multi-function device 10 if it is determined that the password 203 is included in the command data 202. However, this arrangement is not essential. Where the contents data 201 are data for demonstration of the multi-function device 10, for example, the control portion 11 may refer to the contents data 201 to determine whether the contents data 201 include a specific code (specific data) indicating that the contents data 201 are demonstration data, so that the operation to shut down the power supply is inhibited when it is determined that the contents data 201 include the specific code. That is, the determination as to whether the contents data 201 are the demonstration data or not may be made by reference to the contents data 201 per se, rather than to the command data 202 to determine whether the password 203 is included in the command data 202.

The illustrated embodiment is further arranged such that the command data 202 and the password 203 are stored in the external memory 20. However, this arrangement is not essential. For example, the password 203 may be stored in a specific portion of the memory portion 12 of the multi-function device 10. In this case, the display portion 16 displays the password entry view prompting to enter a password, when the power key 142 is pressed while the control portion 11 determines that the contents data 201 are stored in the external memory 20 and while the contents data 201 are displayed on the display portion 16.

What is claimed is:

1. An electronic device comprising:
    an external-memory-medium installing portion in which an external memory medium that can store contents data;
    a display portion configured to be operable to display the contents data stored in the external memory medium;
    a sound generating portion configured to generate a sound;
    a power-shut-down-requirement receiving portion configured to receive a requirement for shutting-down a power supply to the electronic device;
    a contents-data-display commanding portion configured to command the display portion to display the contents data stored in the external memory medium;
    a monitoring portion configured to determine whether the external memory medium is installed in the external-memory-medium installing portion;
    a judging portion configured to judge whether certification information related to the contents data stored in the external memory medium is present whenever the monitoring portion has determined that the external memory medium is installed in the external-memory-medium installing portion;
    a first sound-generation commanding portion configured to command the sound generating portion to generate an alarming sound when the monitoring portion has determined that the external memory medium is not installed in the external-memory-medium installing portion and when the judging portion has judged that the certification information is present; and
    a power supply control portion configured to inhibit an operation to shut down the power supply to the electronic device when the power-shut-down-requirement receiving portion has received said requirement for shutting down the power supply and when the judging portion has judged that the certification information is present,
    wherein the certification information is stored in the external memory medium in which the contents data are stored.

2. The electronic device according to claim 1, wherein the contents data stored in the external memory medium is associated with the certification information, and the power supply control portion includes an entry-view displaying portion configured to command the display portion to provide a certification-entry view prompting an entry of the certification information, when the power-shut-down-requirement receiving portion has received the requirement for shutting down the power supply and when the judging portion has judged that the certification information is present.

3. The electronic device according to claim 1,
    wherein the first sound-generation commanding portion commands the sound generating portion to generate the alarming sound when the monitoring portion has determined that the external memory medium is not installed in the external-memory-medium installing portion when the judging portion has judged that the certification information is present.

4. The electronic device according to claim 1, wherein the power supply control portion inhibits the operation to shut down the power supply to the electronic device when the power-shut-down-requirement receiving portion has received said requirement for shutting down the power supply and when the judging portion has judged that the certification information is present.

5. The electronic device according to claim 1, wherein the power supply control portion includes a first power control portion configured to permit the operation to shut down the power supply to the electronic device when the power-shut-down-requirement receiving portion has received said requirement for shutting down the power supply and when the judging portion has judged that the certification information related to the contents data is not present.

6. The electronic device according to claim 1, wherein the power supply control portion includes an entry-view displaying portion configured to command the display portion to provide a certification-entry view prompting an entry of the certification information, when the power-shut-down-requirement receiving portion has received the requirement for shutting down the power supply and when the judging portion has judged that the certification information is present, and wherein the power supply control portion further includes a second power control portion configured to permit the operation to shut down the power supply to the electronic device when the power-shut-down-requirement receiving portion has received the requirement provided that the judging portion has judged that the certification information related to the contents data is present, and provided that information entered through said certification-entry view is coincident with said certification information.

7. The electronic device according to claim 1, wherein the power supply control portion includes an entry-view displaying portion configured to command the display portion to provide a certification-entry view prompting an entry of the certification information, when the power-shut-down-requirement receiving portion has received said requirement for shutting down the power supply when the judging portion has judged that the certification information is present, the electronic device further comprising a second sound-generation commanding portion configured to command the sound generating portion to generate an alarming sound when the power-shut-down-requirement receiving portion has received the requirement provided that the judging portion has judged that the certification information related to the contents data is present, and provided that the information entered through said certification-entry view is not coincident with the certification information.

8. The electronic device according to claim 1, wherein the power supply control portion includes an entry-view displaying portion configured to command the display portion to provide a certification-entry view prompting an entry of the certification information, when the power-shut-down-requirement receiving portion has received said requirement for shutting down the power supply and when the judging portion has judged that the certification information is present, and the first sound-generating commanding portion commands the sound generating portion not to generate the alarming sound even when the monitoring portion has determined that the external memory medium is not installed in the external-memory-medium installing portion, provided that the judging portion has judged that the certification information related to the contents data is present, and provided that the information entered through said certification-entry view is coincident with the certification information.

9. The electronic device according to claim 1, further comprising a sound-level control portion configured to control an output sound level of the sound generating portion such that a volume of said alarming sound generated by the sound generating portion is larger than a volume of sounds other than said alarming sound.

10. A method of controlling an electronic device including an external-memory-medium installing portion in which an external memory medium that can store contents data, a display portion configured to be operable to display the contents data stored in the external memory medium, and a sound generating portion configured to generate a sound, the method comprising:
receiving a requirement for shutting-down a power supply to the electronic device;
commanding the display portion to display the contents data stored in the external memory medium;
monitoring to determine whether the external memory medium is installed in the external-memory-medium installing portion while the contents data are displayed by the display portion;
judging whether certification information related to the contents data stored in the external memory medium is present whenever it is determined that the external memory medium is installed in the external memory medium, the certification information being stored in the external-memory-medium installing portion in which the contents data are stored;
commanding the sound generating portion to generate an alarming sound when it is determined that the external memory medium is not installed in the external-memory-medium installing portion and when it has been judged that the certification information is present; and
inhibiting an operation to shut down the power supply to the electronic device when said requirement for shutting down the power supply has been received and when it has been judged that the certification information is present.

11. The method according to claim 10, wherein the contents data stored in the external memory medium is associated with the certification information, the method further comprising commanding the display portion to provide a certification-entry view prompting an entry of the certification information, in addition of said inhibiting the operation to shut down the power supply, when the requirement for shutting down the power supply has been received and when it has been judged that the certification information is present.

12. The method according to claim 10,
wherein the commanding the sound generating portion to generate the alarming sound comprises commanding the sound generating portion to generate the alarming sound when it is determined that the external memory medium is not installed in the external-memory-medium installing portion and when it has been judged that the certification information is present.

13. The method according to claim 10, wherein said inhibiting an operation to shut down the power supply to the electronic device comprises inhibiting the operation to shut down the power supply to the electronic device when said requirement for shutting down the power supply has been received and when it has been judged that the certification information is present.

14. The method according to claim 10, further comprising permitting the operation to shut down the power supply to the electronic device when said requirement for shutting down the power supply has been received provided that it has been judged that the certification information related to the contents data is not present.

15. The method according to claim 10, further comprising:
commanding the display portion to provide a certification-entry view prompting an entry of the certification information, when said requirement for shutting down the power supply has been received and when it has been judged that the certification information is present; and
permitting the operation to shut down the power supply to the electronic device when said requirement has been received provided that it has been judged that the certification information related to the contents data is present, and provided that information entered through said certification-entry view is coincident with said certification information.

16. The method according to claim 10, further comprising commanding the display portion to provide a certification-entry view prompting an entry of the certification information, when said requirement for shutting down the power supply has been received and when it has been judged that the certification information is present, and commanding the sound generating portion to generate an alarming sound when said requirement for shutting down the power supply has been received provided that it has been judged that the certification information related to the contents data is present, and provided that the information entered through said certification-entry view is not coincident with the certification information.

17. The method according to claim 10, further comprising commanding the display portion to provide a certification-entry view prompting an entry of the certification information, when said requirement for shutting down the power supply has been received and when it has been judged that the certification information is present, and commanding the sound generating portion not to generate the alarming sound even when the monitoring portion has determined that the external memory medium is not installed in the external-memory-medium installing portion, provided that it has been judged that the certification information related to the contents data is present, and provided that the information entered through said certification-entry view is coincident with the certification information.

18. The method according to claim 10, further comprising controlling an output sound level of the sound generating portion such that a volume of said alarming sound generated by the sound generating portion is larger than a volume of sounds other than the alarming sound.

* * * * *